Aug. 15, 1961     D. H. ALLBRIGHT     2,996,343
PISTON RINGS

Filed March 2, 1959     2 Sheets-Sheet 1

INVENTOR
Dennis Howard Allbright
by Benj. T. Rauber
his attorney

United States Patent Office 2,996,343
Patented Aug. 15, 1961

2,996,343
PISTON RINGS
Dennis Howard Allbright, Foleshill, Coventry, England, assignor to Dunlop Rubber Company Limited, London County, England, a British company
Filed Mar. 2, 1959, Ser. No. 796,663
Claims priority, application Great Britain Mar. 11, 1958
12 Claims. (Cl. 309—29)

This invention relates to piston rings and more particularly to piston rings for duty in conditions of elevated temperature and pressure.

Conditions such as these are found in aircraft installations operated from the exhaust of jet engines and the piston rings hitherto known for rams and jacks included in such installations have comprised split rings, of a material which will withstand the pressures and temperatures involved, accommodated in grooves in a piston, the rings being sufficiently springy to follow up expansion of the cylinder due to a rise in temperature. The disadvantage of this kind of ring, however, is that the pressure within the cylinder tends to act upon the ring and force it radially outwards against the cylinder wall so that the friction increases substantially with increase in cylinder pressure.

The object of the present invention is to provide an improved piston ring wherein this disadvantage is largely overcome.

According to the present invention a piston ring comprises a split ring of low friction material adapted to be associated with a piston and slidably engage the wall of a cylinder, or to be associated with a cylinder and slidably engage the periphery of a piston, and a retaining ring associated with the split ring which restricts the expansion or contraction thereof and is adapted to maintain the degree of interference between the ring and the cylinder wall or piston periphery substantially constant with change in temperature of the cylinder.

Preferably the piston ring is split once only in its circumference and is outwardly springy and the retaining ring encircles the ring to prevent it from freely springing outwardly. The retaining ring is preferably made of the same material as the cylinder or at least has a similar coefficient of expansion as the cylinder material so that, when subjected to temperature changes, the retaining ring and the cylinder increase or decrease in diameter at substantially the same rate, thus enabling the springy friction ring to maintain sliding engagement with the cylinder. The retaining ring should be kept out of actual physical contact with the cylinder and preferably the split ring is of L or like section, the retaining ring being located on the axially-extending limb of the L. Alternatively the retaining ring could be located in an annular groove in one axial end wall of the split ring.

The split ring need not be springy and in an alternative construction it comprises two or more segments of an annulus located in an outer peripheral groove of a retaining ring. The retaining ring, on being heated or cooled expands or contracts at substantially the same rate as the cylinder, thus maintaining the split ring in sliding contact with the wall of the cylinder.

In order that the invention may be more readily understood and carried into practice, reference will now be made to the accompanying drawings, wherein FIGURE 1 is an axial section of a piston and cylinder assembly comprising a pair of piston rings;

Figure 1:
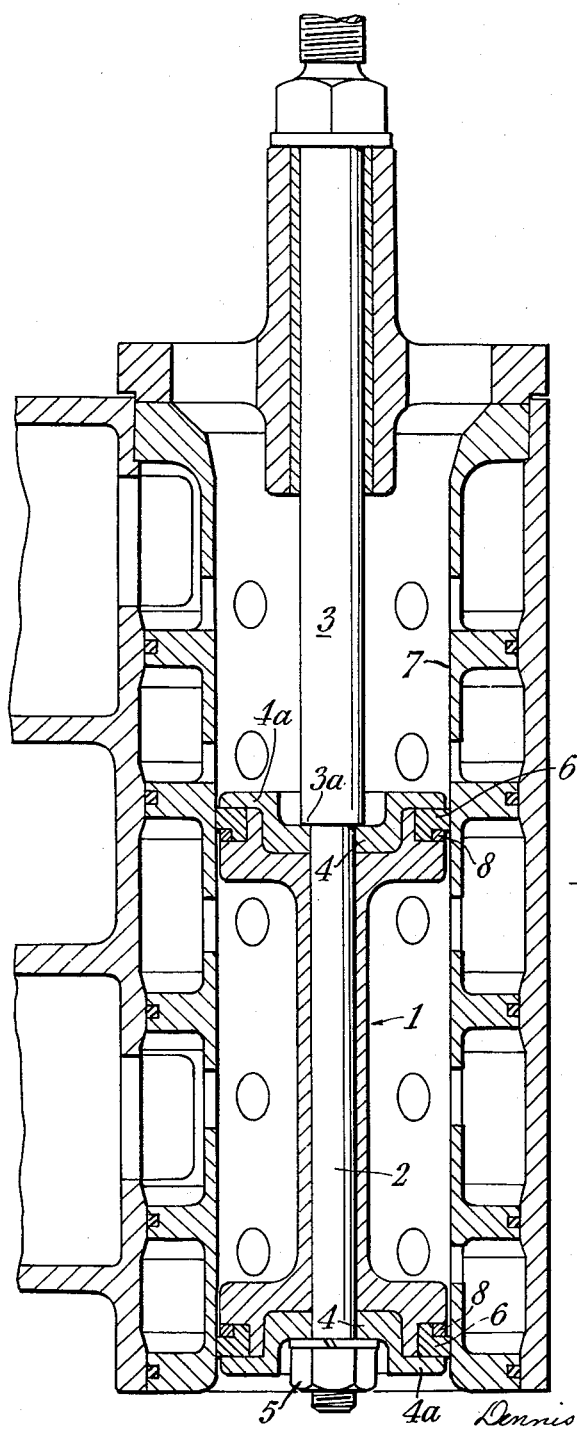

The piston 1 shown in FIGURE 1 is generally dumbbell shaped and is mounted on a spigot 2 which is an extension of a piston rod 3; a pair of dished and flanged plates 4 are held in wells formed in the ends of the piston by a nut 5 and washer, and by a shoulder 3a on the piston rod, respectively.

The flanges 4a of the plates combine with the stepped ends of the piston to define a pair of peripherally extending annular grooves.

Figure 2:
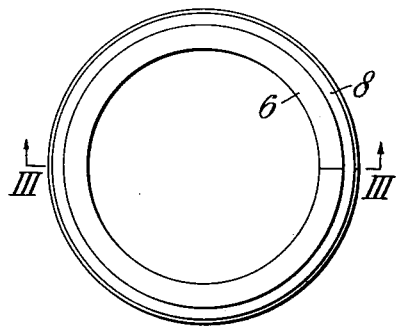
FIGURES 2 and 3 are respectively a plan and a section on the line III—III of FIGURE 2 showing one ring of the assembly.
Figure 3:
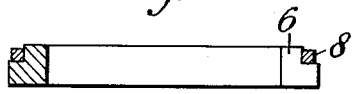

A piston ring 6 (FIGURES 1–3) fabricated of carbon, of L section and shaped as a complete annulus split radially in one place, is located in each groove. The rings are springy and tend to open outwardly to move into intimate contact with the cylinder bore 7.

The outer peripheral face of the longer limb of the L section is adapted to slide on the cylinder bore wall, and the parallel and outer face of the shorter limb of the L section, which extends axially of the cylinder, forms a seating for a retaining ring 8 of rectangular cross-section which is made of the same material as the cylinder. The outside diameter of this ring is slightly less than the diameter of the cylinder bore so that there is no contact therebetween. With the springy carbon piston ring constrained within the metal retaining ring, the piston ring is a sliding fit in the cylinder when both the cylinder and the ring are at the same, e.g. ambient, temperature. The radial splits in the two springy rings are circumferentially staggered.

The retaining rings prevent the split piston rings from expanding outwardly when the cylinder is pressurized so that the frictional interference between rings and bore remains constant. As the cylinder e.g. expands under the influence of heat the retaining rings expand at the same rate, permitting the springy split piston rings to increase in diameter and maintain substantially the same degree of frictional interference with the cylinder wall.

Figure 4:
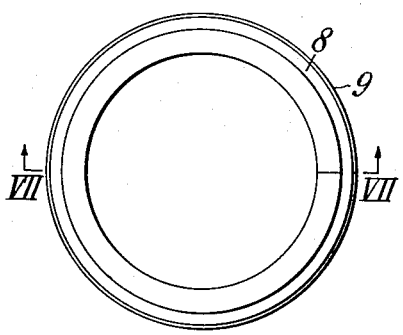
FIGURES 4–6 are plan views of alternative or modified piston rings.
Figure 7:
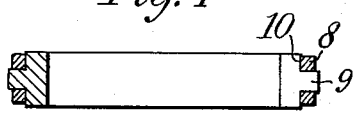
FIGURES 7–9 are sections on the lines VII—VII, VIII—VIII, IX—IX, of FIGURES 4–6 respectively.

In the modification shown in FIGURES 4 and 7 a split carbon piston ring of substantially T-section is shown, the base 9 of the upright of the T being adapted to frictionally engage the cylinder wall: two retaining rings 8 are provided, one located on the radially-outer side 10 of each of the axially-extending arms of the T. This piston ring operates in exactly the same way and has the same advantages as that above described with reference to FIGURES 1–3.

Figure 5:
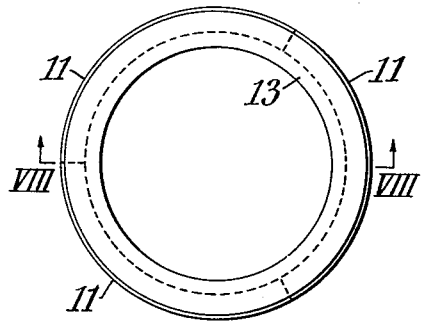
Figure 8:
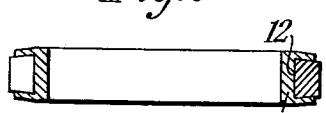

The split carbon ring need not be outwardly springy, and in the alternative shown in FIGURES 5 and 8 comprises three segments 11 of a ring each of frusto-conical cross-section, the base 12 being radially-innermost. These segments, fitted together to form a ring, are contained in a peripheral groove in the radially-outer side of a retaining ring 13 of rectangular cross-section which in turn is held in a piston groove. The sides of the groove in the retaining ring are peened inwardly after fitting the segments to retain them in place. The retaining ring, which is made of the same metal as the cylinder, is out of contact with the wall of the cylinder.

The piston ring described with reference to FIGURES 5 and 8 is a sliding fit in the cylinder and when the cylinder is pressurized the segments cannot move outwardly to increase the frictional interference since they are retained by the retaining ring. With a change in temperature the retaining ring increases or decreases in diameter at the same rate as the cylinder, thus maintaining the frictional interference substantially constant. The segments of the split ring, which is made of carbon, are sufficiently flexible to enable them to adjust themselves to a change in diameter of the retaining ring.

Figure 6:
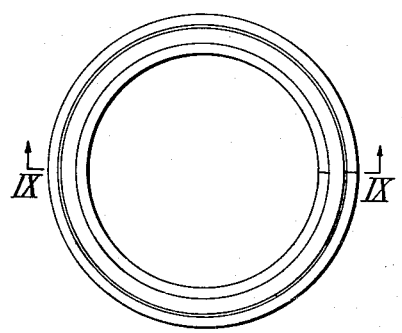
Figure 9:
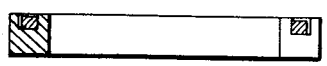

FIGURES 6 and 9 show a further modified piston ring assembly which, like those of FIGURE 1, comprises a complete carbon annulus, split radially in one place. One axial end face 14 of the ring 15 is formed with an annular groove, in which a complete annular retaining ring is located. This ring operates in exactly the same way as that described with reference to FIGURES 4 and 7 and 1-3.

In a modification (not shown) the ring, which may be identical with any of those above described, is associated with the cylinder and slidably engages the periphery of the piston.

Having now described my invention, what I claim is:

1. A piston ring for a piston and cylinder mechanism comprising a split ring to engage the cylinder wall and an endless retaining ring, an annular recess being formed in one of said rings and the other of said rings being engaged in said recess, said retaining ring having a co-efficient of expansion similar to that of the cylinder.

2. A ring as claimed in claim 1 wherein the piston ring is split once only in its circumference, is outwardly springy, and is encircled by the retaining ring.

3. A ring as claimed in claim 1 wherein the piston ring is split into segments, is not springy wherein said retaining ring has an outer pheripheral groove, and wherein the piston ring is located in said outer peripheral groove.

4. A ring as claimed in claim 3 wherein the piston ring is of frusto-conical section and is located with its base radially innermost, side walls of the retaining ring being inwardly deformed after assembly to retain the segments in position.

5. A piston ring for a piston and cylinder mechanism comprising a split ring to engage the cylinder wall and having an annular recess formed therein, and an endless retaining ring housed in the recess, said split ring being of non-metallic low friction material and said retaining ring having a co-efficient of expansion similar to that of the cylinder.

6. A piston ring for a piston and cylinder mechanism comprising a carbon split ring having an outer face to engage the cylinder wall and having an annular recess formed therein, and an endless retaining ring having an outer diameter less than that of said cylinder, the retaining ring being housed in the recess and having a co-efficient of expansion similar to that of the cylinder.

7. A piston ring as claimed in claim 6 wherein said recess is bounded on one side by said outer face of the split ring.

8. A ring as claimed in claim 6 wherein the retaining ring is made of the same material as the cylinder.

9. A ring as claimed in claim 6 wherein the piston ring is of L section, one limb of the L extending axially and the other limb extending radially outwardly of said axially extending limb and the retaining ring is located on the axially extending limb of the L.

10. A ring as claimed in claim 6 wherein said split ring has an annular groove in one axial end wall and the retaining ring is located in said annular groove.

11. A ring as claimed in claim 6 wherein the piston ring of the T section having the arms of the T extending axially of the ring and a pair of retaining rings are located, respectively on the radially outer sides of each of the axially extending arms of the T.

12. A piston ring for a piston and cylinder mechanism comprising a split, outwardly springy ring of low friction material to engage the cylinder wall and an endless ring having a diameter less than that of said cylinder and encircling said split ring in an annular recess formed therein and having a coefficient of expansion similar to that of the cylinder.

References Cited in the file of this patent

UNITED STATES PATENTS

| 757,214 | Morison | Apr. 12, 1904 |
| 1,224,751 | Kinsley | May 1, 1917 |

FOREIGN PATENTS

| 481,540 | Italy | June 3, 1953 |